Figure 1:
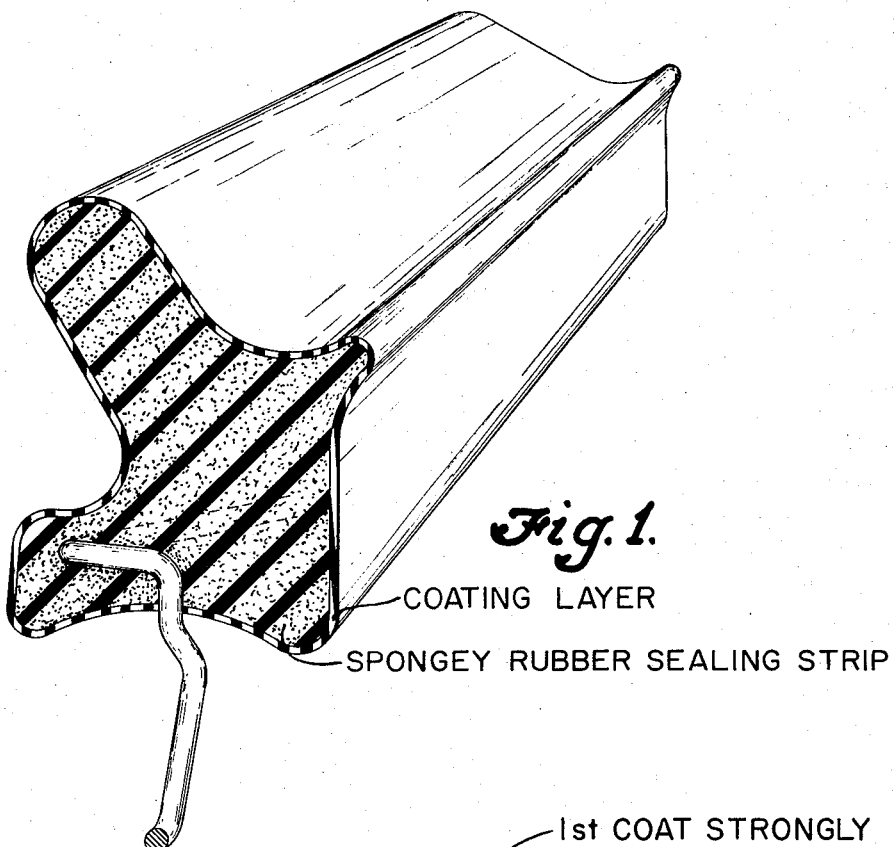

- COATING LAYER
- SPONGEY RUBBER SEALING STRIP

- 1st COAT STRONGLY ADHERENT AND MOISTURE IMPERVIOUS
- 2nd COAT HIGHLY ABRASIVE AND WEAR RESISTANT

INVENTORS
EDWARD P. HARRIS
JAMES R. WALL
ATTORNEY

2,884,668
PLURAL COATED SPONGY SEALING STRIP

Edward P. Harris and James R. Wall, Dayton, Ohio, assignors to General Motors Corporation, Detroit, Mich., a corporation of Delaware Application August 31, 1954, Serial No. 453,432

2 Claims. (Cl. 20—69)

This invention relates to resilient, flexible sealing strips, such as, spongy rubberlike sealing strips and particularly to sealing strips that include a wear-resistant, moisture impervious coating thereover.

The basic object of the invention is to provide strip material, of the general type disclosed in Harris Patent No. 2,579,072 assigned to the assignee of this invention, with a wear resistant, moisture impervious coating coextensive with the entire surface of the strip.

In carrying out the above object, it is a further object to provide a resilient rubberlike sealing strip with a coextensive coating of wear resistant, moisture impervious material which includes at least two layers of different, coextensively adhering, wear resistant materials of predetermined thickness.

Further objects and advantages of the present invention will be apparent from the following description, reference being had to the accompanying drawings wherein a preferred form of the invention is clearly shown.

Figure 2:
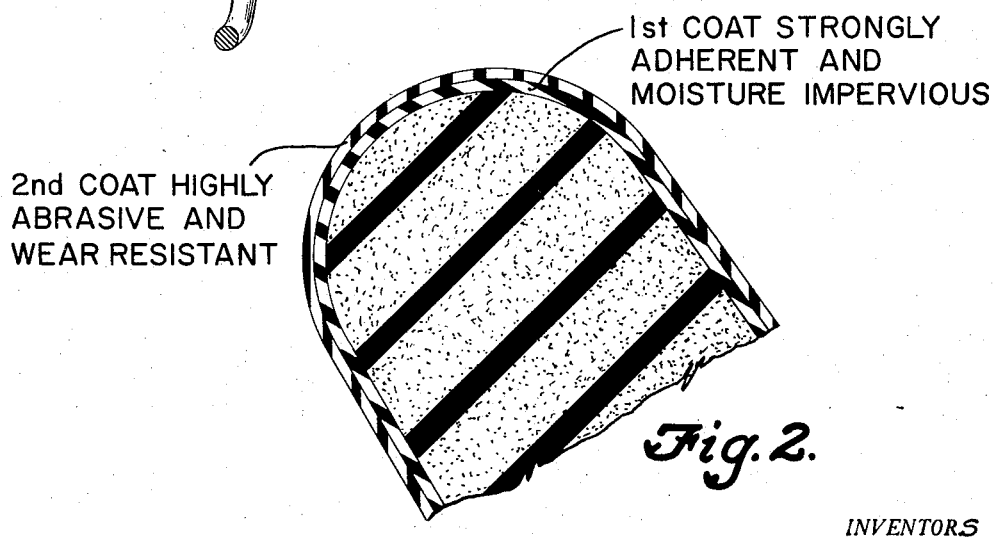

In the drawings:

Figure 1 is a perspective view with one end in cross section showing the coating in exaggerated thickness; and Figure 2 is a view on a greatly enlarged scale of a portion of Figure 1.

In the manufacture of sealing strips having outdoor applications, for example, sealing strips for use in connection with automobile doors, deck lids and the like, it is desirable to form a sealing strip from a spongy rubberlike material which easily conforms to the surfaces to be sealed for providing a weatherproof joint therebetween. These sealing strips are usually fabricated from spongy material, such as cured foamed latex or blown sponge rubberlike material. These spongy materials due to a somewhat open-pored structure, have a tendency to soak up water which, during the winter months, often freezes and damages the strip or during warmer weather, tends to be squeezed out of the strip when the door is being closed, which water then runs down the door onto the upholstery, etc. For this reason, it is highly desirable to coat the strip with a coextensive impervious coating which prevents the ingress of water. A coating of ordinary rubber cement or the like is satisfactory for this purpose, but, due to the environment of the application of the strip, the coating soon ruptures upon repeated opening and closing of the door which causes repeated compression and release of the strip.

Therefore, it is necessary to provide a coating which is not only impervious to water, but which likewise has a high degree of wear resistance. We have found that coatings of this character can best be applied by using at least two layers separatly applied, preferably of different materials, one of which forms a strong bond to the strip and the other of which is tough and wear resistant. This is of great importance since door seal strips, for example, are subjected to normal wear tests in the order of 50,000 door slams and if, after this test is complete, the coating or covering material shows cracks, the material is considered unsuitable for the intended use.

We have found that compounded elastomeric latices and elastomeric cements form highly desirable coating materials and particularly where said two materials are used in successive layers on the surface of the strip. Specifically, we propose to coat the strip by spraying, brushing, dipping or flow coating with a layer of compounded latex or a cement which is permitted to dry on the surface of the strip. The strip is then coated with a layer of an elastomeric cement, usually different from that used in the initial coating. This double coating may then be heated to cure the same and to cause it to bond firmly to the surface of the strip. If a coating of high wear resistance is desired, the first coat may be neoprene cement followed by a coat of Hypalon cement (Hypalon is the Dupont trade name for chlorosulfonated polyethylene).

In all cases, the strip is preferably made from foamed natural rubber latex or foamed butadiene-styrene copolymer latex or suitable combinations of the two latices although synthetic materials, such as butadiene acrylonitrile copolymers, polychloroprene, polyisocyanate reaction products, vinyls, etc., may be used.

We have found that the use of a lubricant, preferably graphite, mica dust or silicone resin increases the life of the strip many-fold since it markedly reduces abrasive tendencies during the slamming of the door which obviously increases the useful life of the coating and the strip.

Preferably, the complete coating used on the strip should be in the order of from .002 to .005″ thick. Coatings of less thickness tend to wear away, while thicker coatings are more apt to crack, pinch and break through. In the case of the latex coatings, neoprene cement and Hypalon coatings, the coatings should be air-dried and then subjected to a temperature of about 275°+25° for 20 min. +5 min. to properly cure the coating, wherein a single cure is used to process both coatings simultaneously.

Some specific examples of suitable combinations of coatings are as follows: a neoprene cement for use in the first coat may be made by mixing 100 parts of polychloroprene (parts by weight), 4 parts accelerator, 12 parts vulcanizing agent and 50 parts of Channel black with sufficient solvent (toluol) to make a 20% solids solution.

We prefer to make the neoprene cement from a 70%–30% mixture of rubber milled and ball milled cements wherein the recipe for each of the cements is identical. That is to say, 70% of the coating is made from a rubber milled mixture and 30% of the cement is made by mixing the same ingredients in a ball mill. This mixed type of cement has the proper dispersion of materials to provide optimum results. In this connection a cement made entirely in a rubber mill or in a ball mill will not generally yield as highly satisfactory results although for many applications it will prove useful.

The second coating, namely, the Hypalon cement, may be made from a representative recipe as follows: chlorosulfonated polyethylene (Hypalon), 100 parts (by weight; accelerator, 10 parts; vulcanizing agent, 20 parts; black (preferably a mixture of Channel black and fine ink black), 30 parts; with enough solvent (toluol 95%, ethanol 5%) to make a 20% solids solution. All of the ingredients of this cement are preferably mixed in a ball mill to obtain the dispersion.

When applying the coating the thickness thereof is determined to some extent by the method of application and viscosity. Thus, when utilizing a coating made in accordance with the recipes noted and using a flow coating method of application, each pass of a foam strip through the coating material, wherein the strip is traveling at a lineal rate of from 6 to 12 feet per minute, will deposit a layer of about .001" thick. If a .002" thick layer of cement is desired, two passes are used. The same control exists in connection with either cement.

After each pass through the flow coating operation, the applied coating is air dried. When the strip is completely coated to the desired thickness and is dry it is heated to a vulcanizing temperature as heretofore noted.

We have found that the use of ball milling in the compounding of the final coating causes an increase in its abrasion resistance. In this case fully rubber milled cements produce satisfactory coatings but have a lower degree of abrasion resistance. The use of the ball milled portion of the cement used in the first coating improves the appearance of this cement. Therefore, the use of ball milling in the combination of the cements which go into the various layers depends to a great measure upon the ultimate use of the finished product.

Satisfactory cements can be made wherein both coatings are compounded in a rubber mill. However, where the ultimate in appearance and abrasion resistance is desired it is preferable to follow the teachings heretofore noted with respect to ball milled compounding techniques.

In place of neoprene cement or neoprene latex the first coat may be any suitable latex cement, for example, cements from a vinyl resin or vinyl latex, natural rubber or rubber latex, butadiene-styrene copolymer elastomer or latex, or butadiene acrylonitrile copolymer elastomer or its latex, etc. Any of these first coating cements may be used in connection with a second coating of chlorosulfonated polyethylene (Hypalon) cement. All of the cements and latex coatings should be suitably compounded by addition of a vulcanizing agent and preferably an accelerator so that the coating may be vulcanized upon curing.

Double coatings of neoprene base material may also be used. In this instance the first coat is preferably of a neoprene latex material while the second coat is a compound neoprene cement to supply the necessary abrasion resistance, for example, a material as disclosed heretofore which includes a substantial quantity of a reinforcing agent such as Channel black.

The use of the specific coatings in the predetermined thicknesses as noted, in addition to yielding a high abrasion and wear resistant covering for the foam and one which has a good appeaarnce has the added function of making the strip resistant to the effects of sunlight aging whereby the useful life of the strip is increased since the strip does not crack or harden upon exposure to the sun. This is quite important in connection with many types of strips used on the vehicles which are exposed to the weather and sun during the major period of their use.

In all cases, the mica dust is preferably added to the coating material by blowing the mica dust on the cement surface prior to the complete drying of the final coat of cement, that is to say, while the cement is still tacky. Where graphite is used, it may be mixed directly with the cement prior to its application on the strip. Quantities in the order of 10% by weight of the rubbery ingredient yields the desired results. Silicone resin may be wiped on the finished strip surface.

In cases where no lubricant is used, the coating material may fail sooner than where lubricants are used, but in many cases the dual coating is sufficiently tough and wear resistant to outlast the test period which is generally considerably in excess of the actual door slams that are imposed on the average door during the life of the car. Thus, while the use of a lubricant is preferred, it is not always necessary to obtain a satisfactory result.

We are aware that sponge rubber articles have been coated with elastomeric coatings in the past, but in all cases, this covering has been of a substantial thickness and of a single ingredient which defeats the very purpose of the coating herein disclosed since coatings of appreciable thickness crack rapidly under actual use conditions leaving the sealing strip of little value. Further, they cause gaps and wrinkles when the strip is bent which hastens the cracking of the coating material.

Furthermore, single coatings do not have the advantages of a double coat wherein good adhesion to the base strip and wear resistance of the coating are the dual objectives.

While the forms of embodiment of the present invention as herein disclosed constitute preferred forms, it is to be understood that other forms might be adopted as may come within the scope of the claims which follow.

What is claimed is as follows:

1. A weather strip, including a base of resilient rubber-like sponge, and a moisture impervious wear resistant resilient covering therefor completely coextensive therewith and bonded thereto, said covering comprising two thin distinct layers of different resilient materials, the first layer bonded coextensively to the surface of the strip and comprising neoprene cement and the second layer being bonded coextensively to the first layer, said second layer comprising chlorosulfonated polyethylene and a lubricant, said lubricant being effective at the surface of the layer for reducing abrasion characteristics when said coating is rubbed against another surface.

2. A weather strip, including a spongy base of foamed natural rubber latex, and a moisture impervious wear resistant resilient covering therefor completely coextensive therewith and bonded thereto, said covering comprising two thin distinct layers of different resilient materials, the first layer bonded coextensively to the surface of the strip and comprising neoprene cement and the second layer being bonded coextensively to the first layer, said second layer comprising chlorosulfonated polyethylene and a mica lubricant, said lubricant being effective at the surface of the layer for resisting abrasion when said coating is rubbed against another surface.

References Cited in the file of this patent

UNITED STATES PATENTS

| | | |
|---|---|---|
| 1,377,729 | Ray | May 10, 1921 |
| 2,232,570 | Spraragen | Feb. 18, 1941 |
| 2,599,440 | Dudley | June 3, 1952 |

OTHER REFERENCES

Rubber Age May 1952, vol. 71, No. 2, pages 205, 220, 221.

Simonds et al.: Handbook of Plastics, 2nd ed. 1949 D. Van Nostrand Co. page 685.

Du Pont, Information Bulletin, Hypalon 52 Chlorosulfonated Polyethylene No. x-33 (1952), page 2; x-32 (1952) page 1; x-7 (1952), page 1.